(12) United States Patent
Girish et al.

(10) Patent No.: US 7,730,326 B2
(45) Date of Patent: Jun. 1, 2010

(54) METHOD AND SYSTEM FOR UPDATING FIRMWARE STORED IN NON-VOLATILE MEMORY

(75) Inventors: Muthya Girish, Santa Clara, CA (US); Guy Bar-Nahum, San Francisco, CA (US); David John Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1249 days.

(21) Appl. No.: 10/988,054

(22) Filed: Nov. 12, 2004

(65) Prior Publication Data

US 2006/0107071 A1 May 18, 2006

(51) Int. Cl.
*G06F 15/177* (2006.01)

(52) U.S. Cl. ................. 713/191; 713/1; 713/2
(58) Field of Classification Search ........... 713/1, 713/2, 191; 726/1, 2
See application file for complete search history.

(56) References Cited

U.S. PATENT DOCUMENTS

| | | | | |
|---|---|---|---|---|
| 6,003,130 | A * | 12/1999 | Anderson | 713/2 |
| 6,161,177 | A * | 12/2000 | Anderson | 713/2 |
| 6,205,548 | B1 * | 3/2001 | Hasbun | 713/2 |
| 6,237,091 | B1 * | 5/2001 | Firooz et al. | 713/1 |
| 6,260,156 | B1 * | 7/2001 | Garvin et al. | 714/8 |
| 6,275,931 | B1 * | 8/2001 | Narayanaswamy et al. | 713/2 |
| 6,308,265 | B1 * | 10/2001 | Miller | 713/2 |
| 6,314,566 | B1 | 11/2001 | Arrouye et al. | |
| 6,401,208 | B2 * | 6/2002 | Davis et al. | 713/193 |
| 6,434,695 | B1 | 8/2002 | Esfahani et al. | |
| 6,628,314 | B1 | 9/2003 | Hoyle | |
| 7,080,243 | B2 * | 7/2006 | Ramiz et al. | 713/1 |
| 7,143,279 | B2 * | 11/2006 | Goud et al. | 713/2 |
| 7,328,434 | B2 * | 2/2008 | Swanson et al. | 709/223 |
| 2003/0041127 | A1 * | 2/2003 | Turnbull | 709/220 |

OTHER PUBLICATIONS

ASUS K7V Slot A Motherboard User's Manual. ©2000 Asustek Inc. http://dlsyr03.asus.com/pub/ASUS/mb/slota/k7v/k7v-101.pdf.*
Wikipedia article for "checksum", originally published Oct. 25, 2003. http://en.wikipedia.org/w/index.php?title=Checksum&oldid=2225587.*

* cited by examiner

*Primary Examiner*—Kimyen Vu
*Assistant Examiner*—Thomas Gyorfi
(74) *Attorney, Agent, or Firm*—Beyer Law Group LLP

(57) ABSTRACT

Improved approaches to update computer program code residing within a computing device are disclosed. By maintaining a former version of the computer program code, the computing device remains operable even if the update to the computer program code fails. Hence, the invention permits reliable updates to computer program code, which is particularly useful for firmware (e.g., boot-up code) of computing devices. For control and security, each version of computer program code can include authentication information. Before the computer program code is used, the computer program code can be required to be authenticated using the authentication information.

29 Claims, 9 Drawing Sheets

METHOD AND SYSTEM FOR UPDATING FIRMWARE STORED IN NON-VOLATILE MEMORY

BACKGROUND OF THE INVENTION

1. Field of the Invention

The present invention relates to computing devices and, more particularly, to updating firmware data in portable computing devices.

2. Description of the Related Art

Computing devices typically perform a boot-up procedure to initiate hardware and to acquire program code to be executed. The program code being acquired can include software and/or firmware. Often, at least an initial portion of program code, known as initial boot-up code, is stored in non-volatile memory. The boot-up procedure retrieves the initial boot-up code and uses such to partially boot the computing device. Once partially booted, other portions of the boot-up code can be obtained from volatile or non-volatile memory.

Since the initial boot-up code is stored in non-volatile memory, its storage is relatively permanent. However, certain types of non-volatile memory can be altered, such as re-written to store new data. Examples of these types of non-volatile memories, which are known as programmable non-volatile memories, include EEPROM and FLASH.

Accordingly, when a computing device is shipped to a customer, the initial boot code is fixed in non-volatile memory. However, the manufacturer of the computing device may want to subsequently change the initial boot code on the computing device. In many cases this requires the computing device to be returned to a service center. In the case of personal computers, a knowledgeable consumer can download via the Internet or read from disk a replacement BIOS program and then "flash" the non-volatile memory in the personal computer to thereby update the BIOS program. Personal computers are able to boot-up in alternate ways, such as from a disk drive. However, for computing devices without alternative ways to boot-up, a failure of the storage of the new boot code to the non-volatile memory renders the computing device inoperative. For example, a failure can occur if the computing device "hangs" or "locks-up" during the storage of the new boot code, or if a loss of power occurs during the storage of the new boot code. Hence, updating software in computing devices other than personal computers is conventionally either impossible or, if possible, burdensome.

Thus, there is a need to facilitate updates to program code within a computing device.

SUMMARY OF THE INVENTION

The invention pertains to improved approaches to update computer program code residing within a computing device. By maintaining a former version of the computer program code, the computing device remains operable even if an update to the computer program code fails. Hence, the invention permits reliable updates to computer program code, which is particularly useful for firmware (e.g., boot-up code) of computing devices. For control and security, each version of computer program code can include authentication information. Before the computer program code is used, the computer program code can be required to be authenticated using authentication information.

The invention can be implemented in numerous ways, including as a method, system, device, apparatus, or computer readable medium. Several embodiments of the invention are discussed below.

As a method for upgrading firmware in a computing device via a host computer, where the computing device includes a non-volatile memory, one embodiment of the invention includes the acts of: receiving updated firmware data from the host computer; identifying a disabled version of firmware data stored within the non-volatile memory, the non-volatile memory storing at least an enabled version of firmware data as well as the disabled version of firmware data; erasing the disabled version of firmware data from the non-volatile memory; writing the updated firmware data to the non-volatile memory where at least a part of the disabled version of firmware data was previously stored; and after the writing has successfully completed, writing authentication information and a numerical reference to the non-volatile memory, the authentication information and the numerical reference being associated with the upgraded firmware data.

As a method for upgrading firmware in a computing device via a host computer, where the computing device includes a non-volatile memory, another embodiment of the invention includes at least the acts of: selecting one of a plurality of stored versions of firmware data that are stored in the non-volatile memory; erasing the selected stored version of the firmware data; writing upgraded firmware data to the non-volatile memory; and writing authentication information and a numerical reference for the upgraded firmware data when the writing of the upgraded firmware data has been successful.

As a method for determining firmware to boot-up a computing device, where the computing device includes a non-volatile memory, one embodiment of the invention includes at least the acts of: locating boot blocks in the non-volatile memory, each of the boot blocks storing a different version of firmware used to at least partially boot-up the computing device; determining authenticity of each of the boot blocks; disregarding any of the boot blocks that have not been properly authenticated; obtaining count values for the remaining boot blocks that have been authenticated; and selecting one of the remaining boot blocks to be a selected authenticated boot block based on the count values for the remaining boot blocks.

As a computing device, one embodiment of the invention includes at least: a programmable non-volatile memory storing at least a boot loader program, a first boot program and a second boot program; and a controller operatively connected to the non-volatile memory. On boot-up of the computing device, the controller executes the boot loader program which determines which of the first boot program and the second boot program to execute as an executed boot program. The computing device can receive an updated boot program from an external source, and then operate to replace one of the first boot program and the second boot program, other than the executed boot program, with the updated boot program.

As a method for upgrading firmware in a computing device via a host computer, one embodiment of the invention includes at least the acts of: determining whether the computing device is connected to the host computer; determining whether a firmware update is available at the host computer for the computing device; and providing firmware update data to the computing device when the determining determines that the firmware update is available.

As a computer readable medium including at least computer program code for upgrading firmware in a computing device via a host computer, wherein the computing device includes a non-volatile memory, one embodiment of the invention includes at least: computer program code for receiving updated firmware data from the host computer; computer program code for identifying a disabled version of firmware data stored within the non-volatile memory, the non-volatile memory storing at least an enabled version of firmware data as well as the disabled version of firmware data; computer program code for erasing the disabled version of firmware data from the non-volatile memory; computer program code for writing the updated firmware data to the non-volatile memory where at least a part of the disabled version of firmware data was previously stored; and computer program code for writing authentication information and a numerical reference to the non-volatile memory after the writing of the updated firmware data has successfully completed, the authentication information and the numerical reference being associated with the upgraded firmware data.

As a computer readable medium including at least computer program code for determining firmware to boot-up a computing device, where the computing device includes a non-volatile memory, one embodiment of the invention includes at least: computer program code for locating boot blocks in the non-volatile memory, each of the boot blocks storing a different version of firmware used to at least partially boot-up the computing device; computer program code for determining authentication of each of the boot blocks; computer program code for disregarding any of the boot blocks that have not been properly authenticated; computer program code for obtaining count values for the remaining boot blocks that have been authenticated; and computer program code for selecting the one of the remaining boot blocks to be a selected authenticated boot block based on the count values for the remaining boot blocks.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches to update computer program code residing within a computing device. By maintaining a former version of the computer program code, the computing device remains operable even if the update to the computer program code fails. Hence, the invention permits reliable updates to computer program code, which is particularly useful for firmware (e.g., boot-up code) of computing devices. For control and security, each version of computer program code can include authentication information. Before the computer program code is used, the computer program code can be required to be authenticated using the authentication information.

The computing device is, for example, a portable computing device. Examples of portable computing devices include a Portable Digital Assistant (PDA), a portable media player, a handheld computing device and a mobile telephone.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
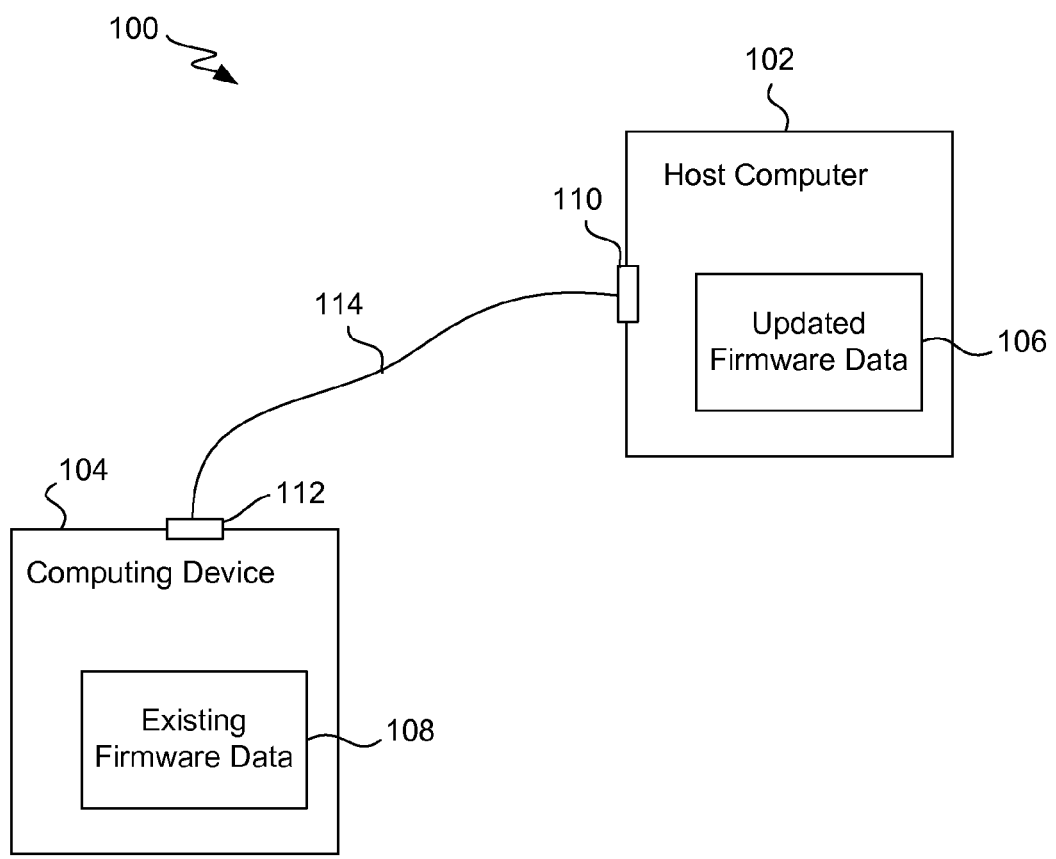
FIG. 1 is a block diagram of a computing environment according to one embodiment of the invention.

FIG. 1 is a block diagram of a computing environment 100 according to one embodiment of the invention. The computing environment 100 includes a host computer 102 and a computing device 104. The host computer 102 maintains updated firmware data 106. The updated firmware data 106 is firmware data that is to be utilized on the computing device 104 or other computing devices. At this point, however, the computing device 104 contains existing firmware data 108. Typically, the computing device 104 includes a non-volatile memory for storage of firmware data. Hence, it is presumed that the updated firmware data 106 is a newer version of the firmware data than the existing firmware data 108 on the computing device 104. The host computer 102 includes a port 110 and the computing device 104 includes a port 112. An electrical cable 114 can couple between the port 110 and the port 112, thereby connecting the host computer 102 to the computing device 104. Typically, the electrical cable 114 is removably connectable between the ports 110 and 112. As an example, the electrical cable 114 can be a USB cable or a FIREWIRE cable, and the ports 110 and 112 can pertain to USB or FIREWIRE ports.

According to the invention, the updated firmware data 106 residing on the host computer 102 can be provided to the computing device 104 via the electrical cable 114 or other data channel (e.g., wireless data channel). Then, at the computing device 104, the updated firmware data 106 being received can be stored such that it becomes the existing firmware data 108.

More specifically, the updating of the firmware data at the computing device 104 is done in a secure and reliable fashion, whereby the firmware data is updated in a manner such that the existing firmware data remains available. Therefore, in the case in which the updated firmware data fails to properly be stored at the computing device 104, the existing firmware data 108 remains useable. Further, in the event that the updated firmware data 106 is properly stored and available at the computing device 104, the existing firmware data is demoted to a reserve capacity as the updated firmware data 106 becomes the primary firmware data.

At start-up, the computing device 104 boots-up using the firmware data stored at the computing device 104. According to the invention, the computing device 104 can simultaneously store the updated firmware data 106 as well as existing firmware data. If the updated firmware data 106 is able to be authenticated, the updated firmware data 106 is the firmware utilized by the computing device 104 during boot-up. On the other hand, if the updated firmware data 106 is not able to be authenticated, the existing firmware data 108 can continue to be used.

Figure 2:
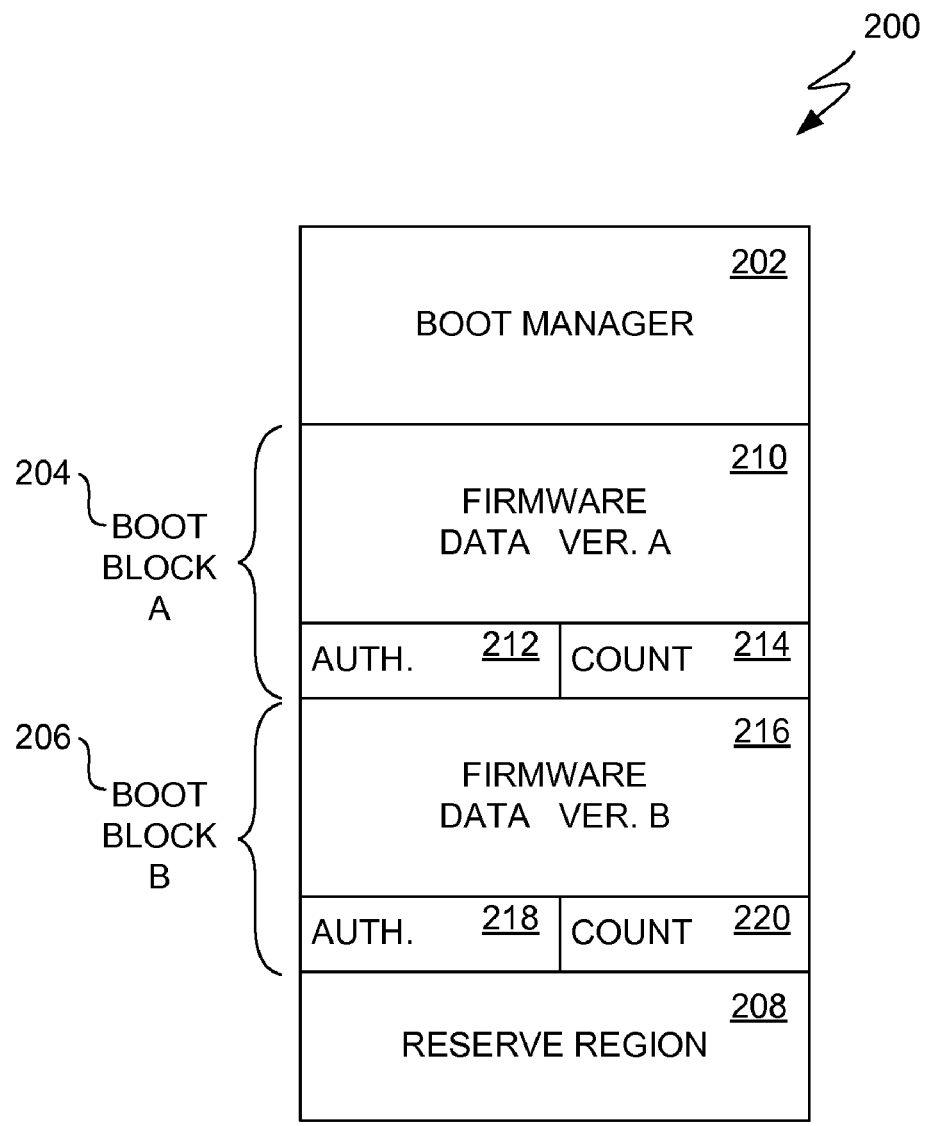
FIG. 2 illustrates a diagram of a non-volatile memory according to one embodiment of the invention.

FIG. 2 illustrates a diagram of a non-volatile memory 200 according to one embodiment of the invention. The non-volatile memory 200 is provided within a computing device, such as the computing device 104 illustrated in FIG. 1. The non-volatile memory 200 stores a boot manager 202, a boot block A 204, and a boot block B 206. The boot manager 202 pertains to programming code to initiate a boot-up sequence of the computing device as well as to manage the boot blocks 204 and 206. The management of the boot blocks 204 and 206 operates to select which one of the boot blocks is to be utilized during the boot-up sequence. The boot block A 204 stores firmware data (version A) 210, authentication information 212 and a count 214. The boot block B 206 stores firmware data (version B) 216, authentication information 218 and a count 230. Still further, the non-volatile memory 200 may include a reserve region 208 that provides additional data storage capacity within the non-volatile memory 200, should such be needed for boot block storage.

Figure 3:
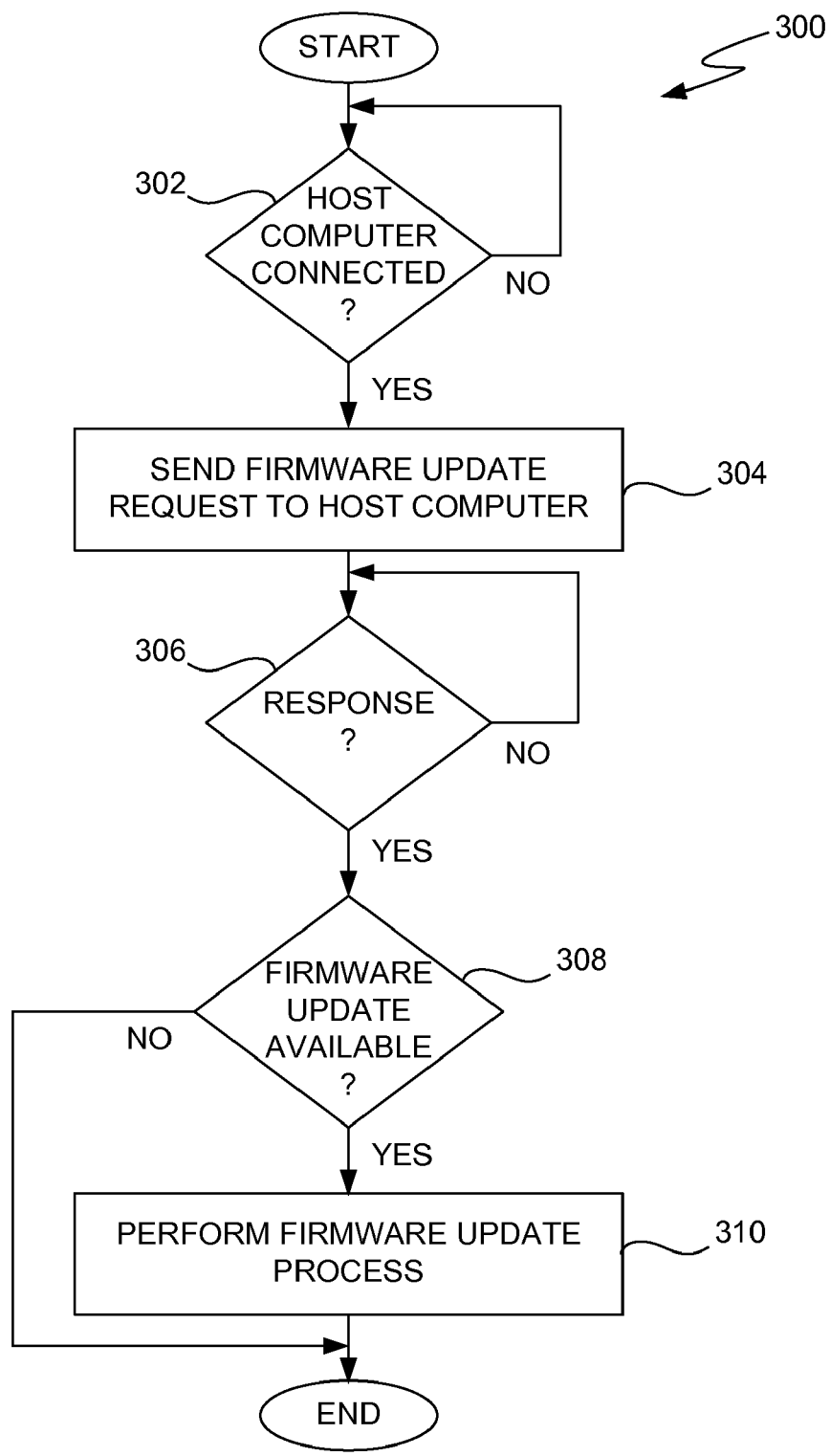
FIG. 3 is a flow diagram of a firmware delivery process according to one embodiment of the invention.

FIG. 3 is a flow diagram of a firmware delivery process 300 according to one embodiment of the invention. The firmware delivery process 300 is, for example, performed by a computing device, such as the computing device 104 illustrated in FIG. 1.

The firmware delivery process 300 begins with a decision 302 that determines whether a host computer is connected. When the decision 302 determines that a host computer is not connected, the firmware delivery process 300 awaits such a connection. In other words, the firmware delivery process 300 can be activated once a host computer is connected to the computing device. The connection between the host computer and the computing device can be wired (e.g., electrical cable) or wireless (e.g., WiFi, 802.11).

In any case, once the decision 302 determines that the host computer is connected to the computing device, a firmware update request is sent 304 to the host computer. Then, a decision 306 awaits a response to the firmware update request from the host computer. When the decision 306 determines that a response has not yet been received, the firmware delivery process 300 awaits such a response.

Once the decision 306 determines that a response has been received, a decision 308 determines whether a firmware update is available. Here, the response to the firmware update request is provided to the computing device by the host computer. The response indicates at least whether a firmware update is available for the computing device. Hence, when the decision 308 determines that a firmware update is available, then a firmware update process is performed 310. After the firmware update process has been performed 310, the firmware delivery process 300 ends. On the other hand, when the decision 308 determines that a firmware update is not available, then the firmware delivery process 300 directly ends without performing any firmware update.

Figure 4:
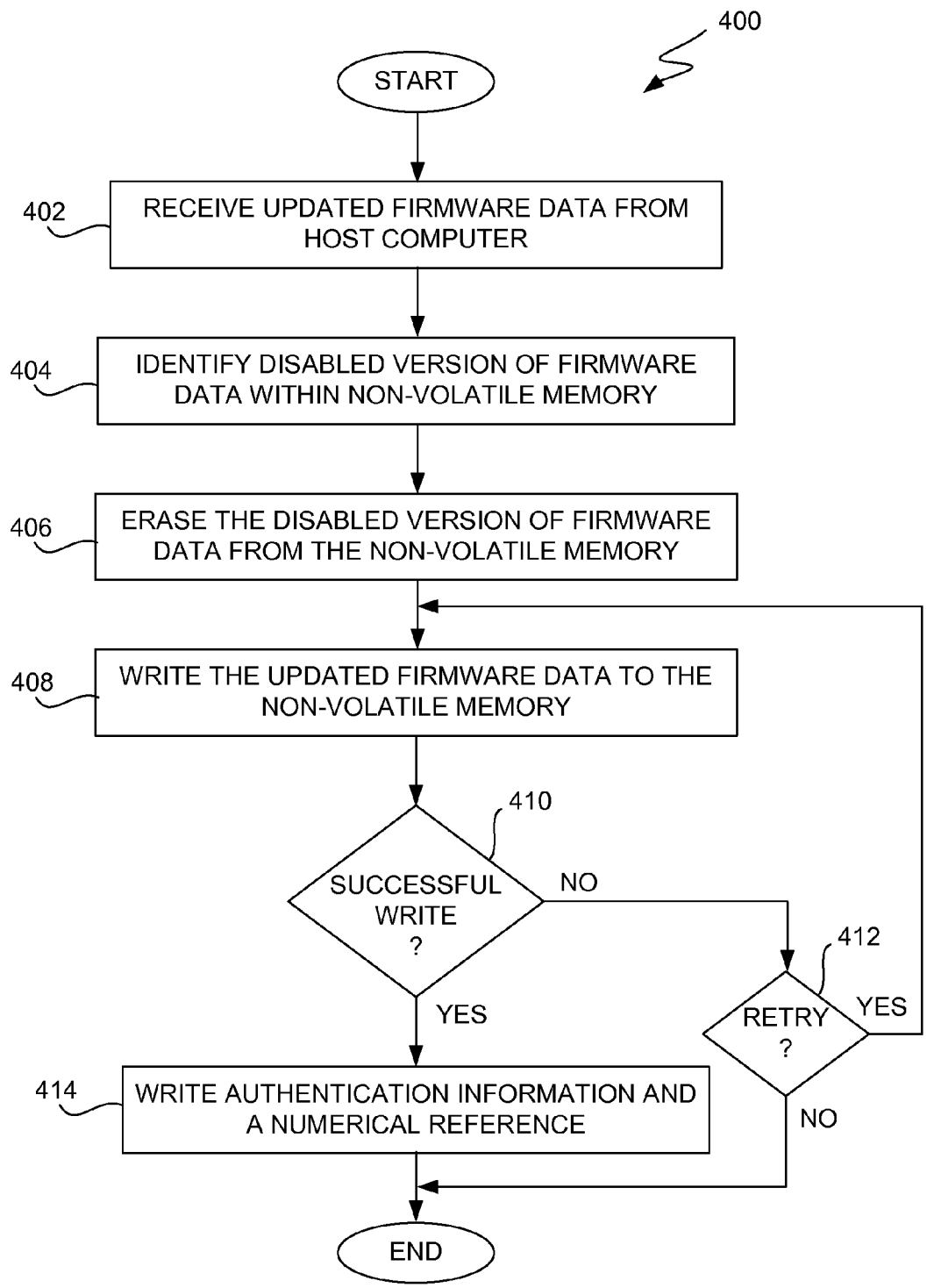
FIG. 4 is a flow diagram of a firmware update process according to one embodiment of the invention.

FIG. 4 is a flow diagram of a firmware update process 400 according to one embodiment of the invention. The firmware update process 400 is, for example, performed by a computing device. For example, the computing device can be the computing device 104 illustrated in FIG. 1.

The firmware update process 400 is, for example, suitable for use by the block 310 illustrated in FIG. 3. However, the firmware update process 400 is equally useable apart from the firmware delivery process 300 illustrated in FIG. 3.

The firmware update process 400 initially receives 402 updated firmware data from a host computer. Then, a disabled version of firmware data within the non-volatile memory of the computing device is identified 404. Stored within the non-volatile memory is not only a disabled version of firmware data but also an enabled version of firmware data. The disabled version of firmware data represents an earlier version of the firmware data that has since been rendered "disabled" (though still usable), given that the enabled version of firmware data represents a newer and more current version of firmware data.

Next, the disabled version of firmware data is erased 406 from the non-volatile memory. Then, the updated firmware data is written 408 to the non-volatile memory. Hence, the disabled version of firmware data is effectively replaced by the updated firmware data. However, the non-volatile memory still stores the enabled version of firmware data, though such previously enabled version effectively becomes the next disabled version because the updated firmware data that is written 408 becomes the next enabled version of firmware data. Following the write 408 of the updated firmware data, a decision 410 determines whether the write operation was successful. When the decision 410 determines that the write operation was not successful, a decision 412 can determine whether to retry the write operation. When the decision 412 determines that the write operation should be retried, the firmware update process 400 returns to repeat the block 408 and subsequent blocks. Alternatively, when the decision 412 determines that the write operation should not be retried, then the firmware update process 400 ends.

On the other hand, when the decision 410 determines that the write operation was successful, then authentication information and a numerical reference are written 414 to the non-volatile memory. The authentication information is used to authenticate the source and/or content of the updated firmware data. The numerical reference, in one embodiment, can serve as a count value. The count value can be used to distinguish the enabled version from the disabled version of the firmware data. After the authentication information and the numerical reference are written 414, the firmware update process 400 is complete and ends.

Figure 5A:
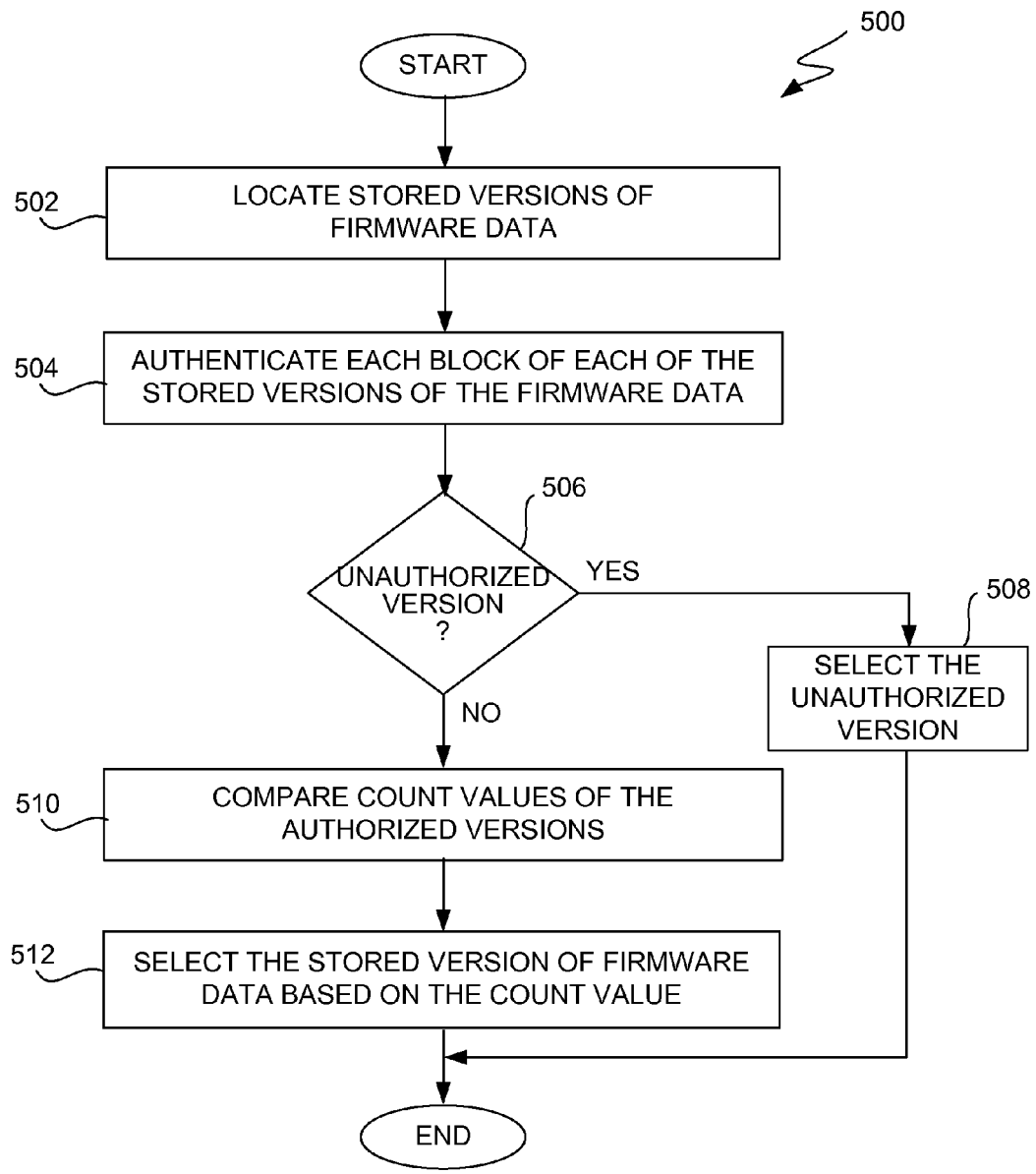
FIGS. 5A-5C are flow diagrams of a firmware update process according to another embodiment of the invention.
Figure 5B:
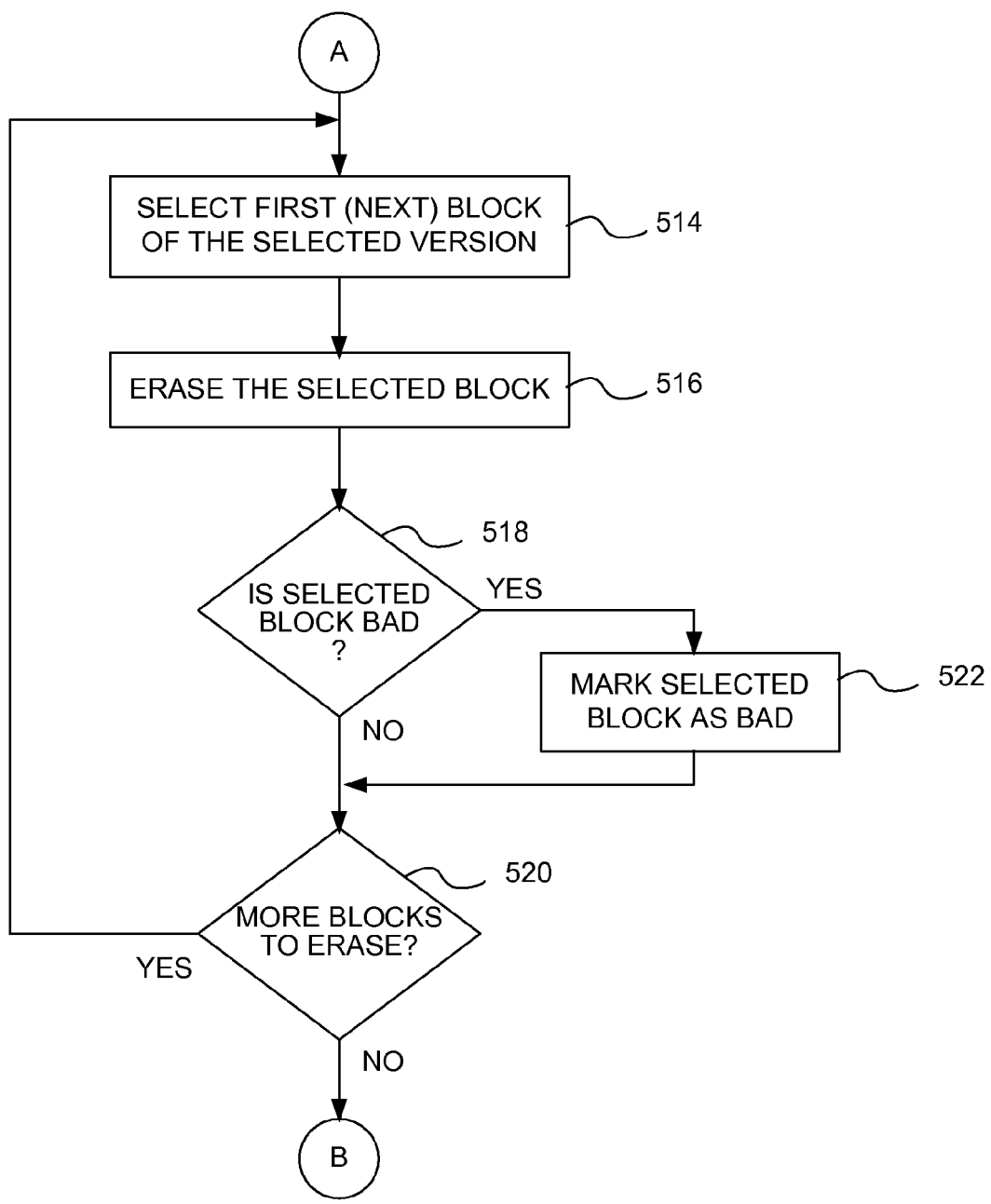
Figure 5C:
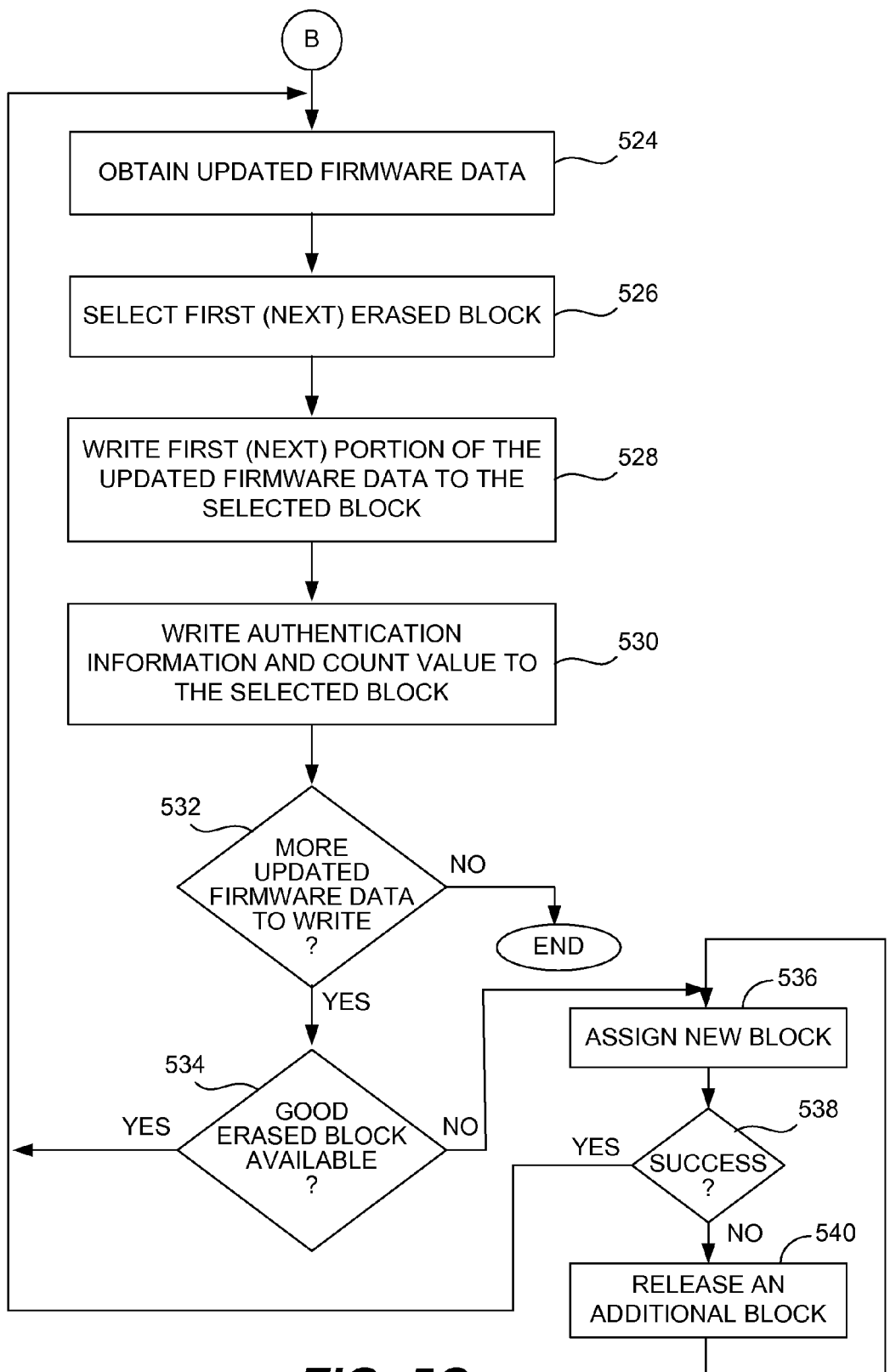

FIGS. 5A-5C are flow diagrams of a firmware update process 500 according to another embodiment of the invention. The firmware update process 500 is, for example, performed by a computing device. As an example, the computing device can be the computing device 104 illustrated in FIG. 1.

The firmware update process 500 initially locates 502 stored versions of firmware data. The computing device typically has two or more versions of firmware data stored in a non-volatile memory of the computing device. After the stored versions of firmware data are located 502, each block of each of the stored versions of the firmware data is authenticated 504. Then, a decision 506 determines whether any of the versions of the firmware data are unauthorized. A version of firmware data is deemed unauthorized if each of its blocks are unable to be authenticated. When the decision 506 determines that one of the versions of the firmware data is unauthorized, then the unauthorized version is selected 508. On the other hand, when the decision 506 determines that there are no unauthorized versions, count values of the authorized versions are compared 510. Each of the stored versions of the firmware data includes a count value. In one embodiment, for a given stored version of firmware data, a count value is provided within each block of the firmware data. In another embodiment, for a given stored version of firmware data, a count value is stored only once. The count value pertains to a count that is incremented each time a new version of firmware data is stored to the non-volatile memory of the computing device. Hence, the count can be utilized to distinguish newer versions from older versions of firmware data. After the count values are compared 510, one of the stored versions of firmware data is selected 512 based on the respective count values. For example, the stored version of firmware data having the lowest count value can be selected 512.

Following the blocks 508 or 512, the firmware update process 500 next performs processing to erase the selected version of firmware data. In particular, a first block of the selected version is initially selected 514. The selected block is then erased 516. A decision 518 then determines whether the selected block is bad. In this embodiment, upon erasure of a block, the non-volatile memory provides an indication whether or not the block is no longer operable (i.e., "bad"). Such erasure operations are typical for a NAND-type of FLASH memory, which is one type of non-volatile memory. Hence, when the decision 518 determines that the selected block is bad, the selected block is marked 522 as being bad. Following the block 522, or following the decision 518 when the selected block is not bad, a decision 520 determines whether there are more blocks to erase. When the decision 520 determines that there are more blocks to erase, the firmware update process 500 returns to repeat the block 514 and subsequent blocks so that the next block of the selected version can be similarly erased.

Once the decision 520 determines that there are no more blocks to be erased, then the firmware update process 500 writes updated firmware data to the non-volatile memory. In particular, updated firmware data is obtained 524. In one embodiment, the updated firmware data is obtained from a host computer and made available to the computing device. As shown in FIG. 5C, the updated firmware data can be written in a block-by-block manner. Initially, a first erased block is selected 526. Here, it should be noted that the selected block was previously erased and was not marked as being bad. In other words, only those blocks that are operable are selected. Next, a first portion of the updated firmware data is written 528 to the selected block. Further, authentication information and a count value can be written 530 to the selected block. In this embodiment, the authentication information and count value are stored with each block being written. In other embodiments, the authentication information and the count value can be written only once for a given version of firmware data.

Thereafter, a decision 532 determines whether there is more updated firmware data to be written. When the decision 532 determines that there is more updated firmware data to be written, a decision 534 determines whether there are additional good erased blocks available for storage of the additional updated firmware data. When the decision 534 determines that there is a good erased block available, the firmware update process 500 returns to repeat the block 526 and subsequent blocks so that a next erased block can be selected 526 and written 528 and 530.

Alternatively, when the decision 534 determines that a good erased block is not available, then a new block is assigned 536 as the selected block. A decision 538 then determines whether a new block was successfully assigned. When the decision 538 determines that a new block was successfully assigned, the firmware update process 500 returns to repeat the block 526 and subsequent blocks. On the other hand, when the decision 538 determines that a new block was not successfully assigned, an additional block is released 540 (i.e., freed-up). After the additional block is released 540, the firmware update process 500 returns to repeat the block 536 so that the newly released block can be assigned 536. The release of an additional block typically involves the reformatting of the non-volatile memory so that additional blocks can be made available for storage of firmware data. Typically, the assigning of new blocks can be initially done with respect to a set of reserve blocks that are reserved for usage in storing firmware data. However, when the reserve blocks are all consumed, the firmware update process 500 is able to release additional blocks so that the updated firmware data is able to be completely stored within the non-volatile memory. In any case, once the decision 532 determines that there is no more updated firmware data to be written, the firmware update process 500 is complete and ends.

Figure 6:
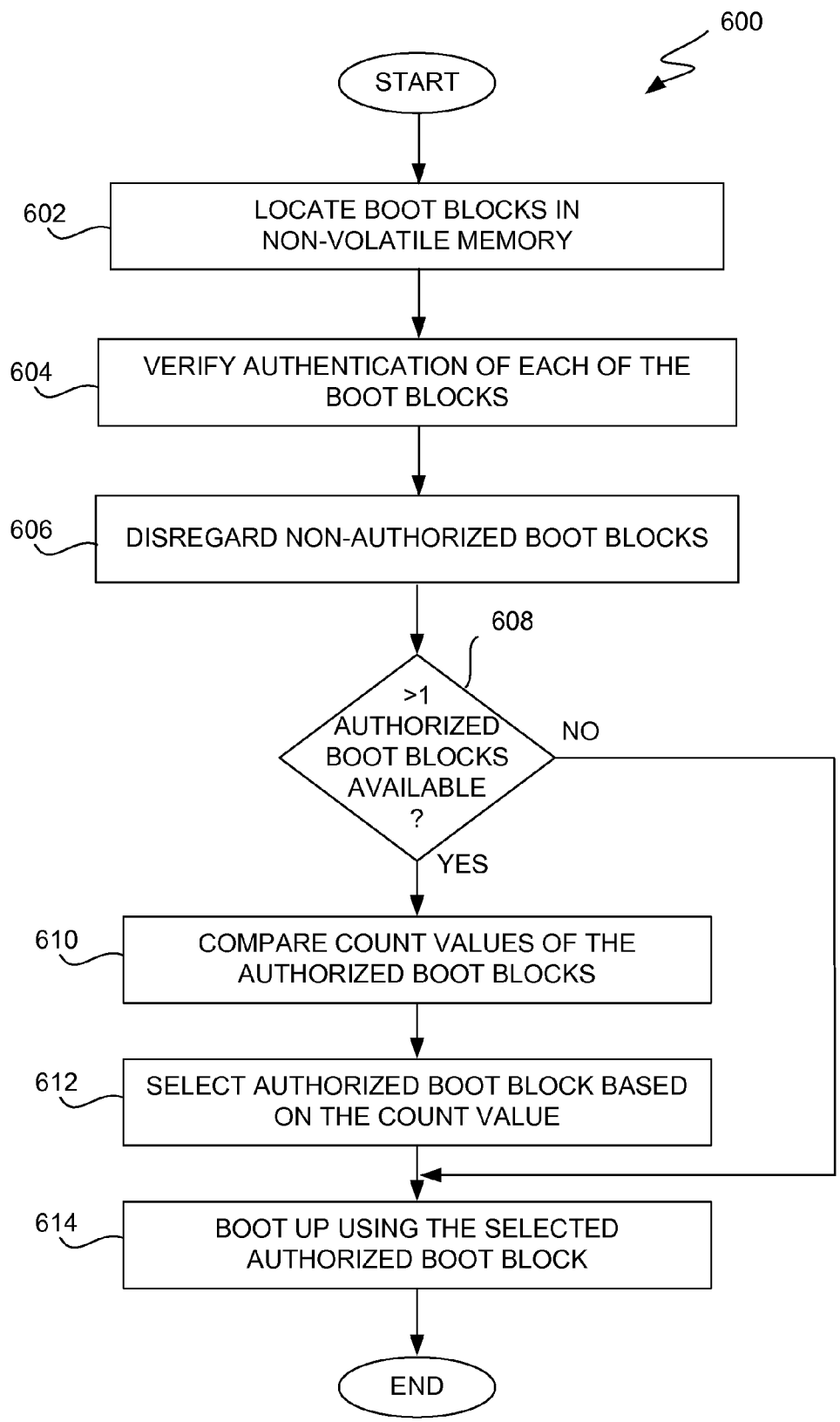
FIG. 6 is a flow diagram of a boot-up process according to one embodiment of the invention.

FIG. 6 is a flow diagram of a boot-up process 600 according to one embodiment of the invention. The boot-up process 600 is, for example, performed by a computing device. For example, the computing device can be the computing device 104 illustrated in FIG. 1.

The boot-up process 600 initially locates 602 boot blocks in the non-volatile memory of the computing device. The computing device is typically able to boot-up using any of the plurality of boot blocks stored in the non-volatile memory. Then, authentication of each of the boot blocks is verified 604. Any of the unauthorized boot blocks are then disregarded 606. In other words, the boot block must be authenticated (i.e., authorized) for it to be utilized for boot-up of the computing device. A decision 608 determines whether there are more than one authorized boot block available. When the decision 608 determines that there are more than one authorized boot block available, count values of each of the authorized boot blocks are compared 610. The authorized boot block to be utilized is then selected 612 based on the count value. In one embodiment, the authorized boot block having the greatest count value is selected. After the authorized boot block has been selected 612, the computing device is booted-up 614 using the selected authorized boot block. On the other hand, following the decision 608 when there is only one authorized boot block, the blocks 610 and 612 are bypassed. After the boot-up 614 of the computing device, the boot-up process 600 is complete and ends.

The computing device as described herein can be a media player capable of playing (including displaying) media items. The media items can pertain to audio items (e.g., audio files or songs), videos (e.g., movies) or images (e.g., photos).

Figure 7:
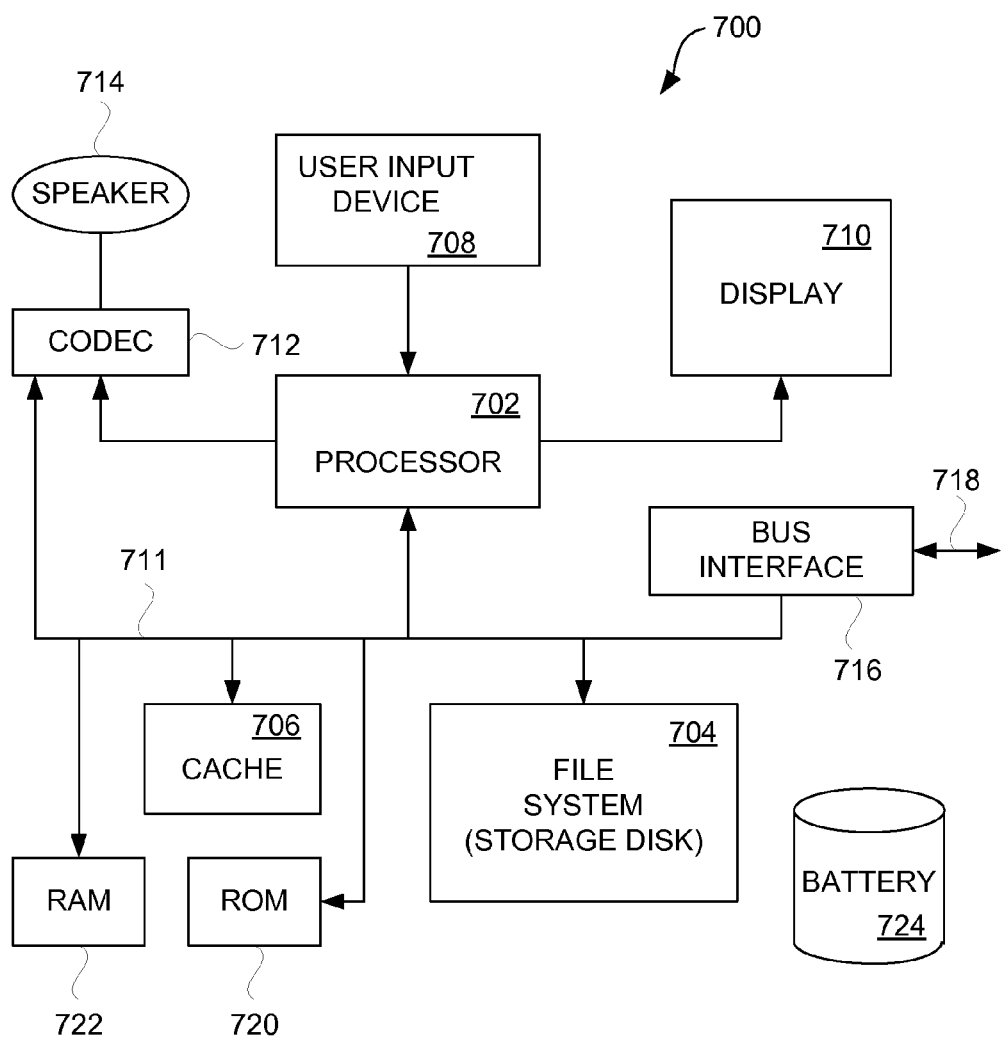
FIG. 7 is a block diagram of a media player suitable for use with the invention.

FIG. 7 is a block diagram of a media player 700 suitable for use with the invention. The media player 700 can include the circuitry of the computing device 104 in FIG. 1 and/or can perform the operations described with reference to FIGS. 3-6.

The media player 700 includes a processor 702 that pertains to a microprocessor or controller for controlling the overall operation of the media player 700. The media player 700 stores media data pertaining to media items in a file system 704 and a cache 706. The file system 704 is, typically, a storage disk or a plurality of disks. The file system 704 typically provides high capacity storage capability for the media player 700. However, since the access time to the file system 704 is relatively slow, the media player 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is often a concern when the media player 700 is a portable media player that is powered by a battery (not shown). The media player 700 also includes a RAM 720 and a Read-Only Memory (ROM) 722. The ROM 722 can store, in a non-volatile manner, programs, utilities or processes to be executed. The programs can, for example, pertain to firmware (e.g., boot-up code), system programs or application programs. The ROM 722 is also programmable. For example, the ROM 722 can be implemented by an EEPROM or a FLASH type non-volatile memory device. FLASH type non-volatile memory is known to be available in NOR and NAND implementations. The RAM 720 provides volatile data storage, such as for the cache 706.

The media player 700 also includes a user input device 708 that allows a user of the media player 700 to interact with the media player 700. For example, the user input device 708 can take a variety of forms, such as a button, keypad, dial, etc. Still further, the media player 700 includes a display 710 (screen display) that can be controlled by the processor 702 to display information to the user. A data bus 711 can facilitate data transfer between at least the file system 704, the cache 706, the processor 702, and a coder/decoder (CODEC) 712.

In one embodiment, the media player 700 serves to store a plurality of media items (e.g., songs) in the file system 704. When a user desires to have the media player play a particular media item, a list of available media items is displayed on the display 710. Then, using the user input device 708, a user can select one of the available media items. The processor 702, upon receiving a selection of a particular media item, supplies the media data (e.g., audio file) for the particular media item to the CODEC 712. The CODEC 712 then produces analog output signals for a speaker 714. The speaker 714 can be a speaker internal to the media player 700 or external to the media player 700. For example, headphones or earphones that connect to the media player 700 would be considered an external speaker.

The media player 700 also includes a bus interface 716 that couples to a data link 718. The data link 718 allows the media player 700 to couple to a host device (e.g., host computer or power adapter). The data link 718 can also provide power to the media player 700.

The various aspects, embodiments, implementations or features of the invention can be used separately or in any combination.

The invention is preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that computer program code, such as firmware data, for a computing device can be upgraded in a reliable manner. Another advantage of the invention is that authorization information and/or count values are provided for the computer program code. Still another advantage of the invention is that the computer program code can be stored in the computing device in a block-by-block manner, with additional blocks available from a reserve region.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for upgrading firmware in a computing device, the computing device including a non-volatile memory, the method comprising:
    obtaining updated firmware data;
    selecting a disabled version of firmware data from two or more disabled versions of firmware data stored within the non-volatile memory, by authenticating each of the two or more disabled versions of firmware data, and based on authentication information and a version indictor stored for each one of the disabled versions of firmware data, the non-volatile memory also storing at least one enabled version of the firmware data;
    initiating writing the updated firmware data where at least a part of the selected disabled version of firmware data was previously stored in the non-volatile memory, thereby initiating overwriting of the at least one part of the selected disabled version of the firmware with the updated firmware data;
    determining whether the writing of the updated firmware data has successfully completed;
    writing authentication information and a new version indicator for the updated firmware data stored in the non-volatile memory only when the determining determines that the writing of the updated firmware data has successfully completed, wherein the authentication information allows verification of authenticity of the updated firmware, and wherein the new version indicator is indicative of an updated version of the firmware data, thereby allowing the updated firmware data stored in the non-volatile memory to be identified as an updated version of the enabled version of firmware data.

2. A method as recited in claim 1, wherein the numerical reference is a count value that is incremented each time updated firmware data is stored.

3. A method as recited in claim 1, wherein the computing device is a handheld computing device.

4. A method as recited in claim 3, wherein the handheld computing device is a PDA or a mobile telephone.

5. A method as recited in claim 1, wherein the obtaining comprises:
    determining whether the computing device is connected to a host computer;
    determining whether updated firmware data is available at the host computer for the computing device; and
    providing the updated firmware data to the computing device.

6. A method for upgrading firmware in a computing device via a host computer, the computing device having a non-volatile memory, the method comprising:
    (a) selecting one of a plurality of stored versions of firmware data in the non-volatile memory, wherein each of the plurality of stored versions of firmware is stored in at least one block within the non-volatile memory, wherein each of the plurality of stored versions of firmware data include authentication information and a numerical reference; and wherein the selecting (a) comprises:
        (a1) determining whether each of the plurality of stored versions of firmware data are authorized based on the authentication information associated therewith;
        (a2) obtaining the numerical reference associated with each of the plurality of stored versions of firmware data; and
        (a3) selecting one of the plurality of stored versions of firmware data based on the numerical references and the authentication of the authentication information;
    (b) erasing the selected stored version of the firmware data;

(c) writing upgraded firmware data to the selected stored version of the firmware data; and (d) writing authentication information and a numerical reference for the upgraded firmware data the selected stored version of the firmware data only when the writing (c) was successful.

7. A method as recited in claim 6, wherein the authentication information comprises a signature.

8. A method as recited in claim 6, wherein during the erasing (b), any of the blocks that are deemed bad are so marked.

9. A method as recited in claim 8, wherein the writing (c) writes the upgraded firmware data to only those of the erased blocks that are not marked as being bad.

10. A method as recited in claim 9 wherein the erasing (b) erases the selected stored version of the firmware data block-by-block, and wherein, during the erasing (b), any of the blocks that are deemed bad are so marked.

11. A method as recited in claim 9, wherein when the writing (c) of the upgraded firmware data consumes all of the erased blocks that are not marked as being bad, one or more additional blocks in the non-volatile memory are allocated for storage of the upgraded firmware data.

12. A method as recited in claim 9, wherein when the writing (c) of the upgraded firmware data consumes all of the erased blocks that are not marked as being bad, then one or more reserve blocks in the non-volatile memory are allocated for storage of the upgraded firmware data.

13. A method as recited in claim 12, wherein when the writing (c) of the upgraded firmware data consumes all of the erased blocks that are not marked as being bad as well as all of the one or more reserve blocks, then one or more released blocks in the non-volatile memory are allocated for storage of the upgraded firmware data.

14. A method as recited in claim 6, wherein the writing (d) writes the authentication information and the numerical reference for a given block after the writing (c) successfully writes each block in the non-volatile memory.

15. A method as recited in claim 6, wherein the erasing (b) releases a plurality of erased blocks in the non-volatile memory, and wherein the writing (c) writes the upgraded firmware data to the erased blocks.

16. A method for determining firmware to boot-up a computing device, the computing device including a non-volatile memory, the method comprising:
locating two or more boot blocks in the non-volatile memory, each of the boot blocks storing a different version of firmware operable to at least partially boot-up the computing device;
determining authenticity of each of the two or more boot blocks rip or to selection of any of the boot blocks as a selected block for booting the computing device;
disregarding any of the boot blocks that have not been properly authenticated prior to selection of any of the boot blocks as a selected block for booting the computing device;
obtaining one or more count values for the one or more remaining boot blocks that have been successfully authenticated, wherein each count value is indicative of a specific version of the firmware; and
selecting one of remaining boot blocks that have been successfully authenticated as the selected authenticated boot block for booting the computing device, based on the specific versions of the firmware indicated by the count values of the remaining one or more boot blocks that have been successfully authenticated.

17. A method as recited in claim 16, wherein the method further comprises:
thereafter booting-up the computing device using the selected authenticated boot block.

18. A method as recited in claim 16, wherein the selecting comprises comparing the count values for the remaining boot blocks that have been authenticated.

19. A method as recited in claim 16, wherein the selecting comprises:
comparing the count values for the remaining boot blocks that have been authenticated; and
selecting the one of the remaining boot blocks having the largest of the count values.

20. A method as recited in claim 16, wherein the computing device is a handheld computing device.

21. A method as recited in claim 20, wherein the handheld computing device is a PDA or a mobile telephone.

22. A computer readable medium including at least executable computer program code embodied in a tangible form and operable to be executed by a computing device for upgrading firmware in the computing device, the computing device including a non-volatile memory, the computer readable medium comprising:
executable computer program code for obtaining updated firmware data;
executable computer program code for selecting a disabled version of firmware data from two or more disabled versions of firmware data stored within the non-volatile memory, by authenticating each of the disabled versions of firmware data, and based on authentication information and a version indictor stored for each one of the disabled versions of firmware data, the non-volatile memory also storing at least one enabled version of the firmware data;
executable computer program code for initiating writing the updated firmware data where at least a part of the selected disabled version of firmware data was previously stored in the non-volatile memory, thereby initiating overwriting of the at least one part of the selected disabled version of the firmware with the updated firmware data;
executable computer program code for determining whether the writing of the updated firmware data has successfully completed;
executable computer program code for writing authentication information and a new version indicator for the updated firmware data stored in the non-volatile memory only when it is determined that the writing of the updated firmware data has successfully completed, wherein the authentication information allows verification of authenticity of the updated firmware, and wherein the new version indicator is indicative of an updated version of the firmware data thereby allowing the updated firmware data stored in the non-volatile memory to be identified as an updated version of the enabled version of firmware data.

23. A computer readable medium including at least executable computer program code embodied in a tangible form for determining firmware to boot-up a computing device, the computing device having a non-volatile memory, the computer readable medium comprising:
executable computer program code for locating boot blocks in the non-volatile memory, each of the boot blocks storing a different version of firmware used to at least partially boot-up the computing device;
executable computer program code for determining authentication of each of the boot blocks prior to selection of any of the boot blocks as a selected block for booting the computing device;

executable computer program code for disregarding any of the boot blocks that have not been properly authenticated prior to selection of any of the boot blocks as a selected block for booting the computing device;

executable computer program code for obtaining one or more count values for the one or more remaining boot blocks that have been successfully authenticated, wherein each count value is indicative of a specific version of the firmware; and executable computer program code for selecting one of remaining boot blocks that have been successfully authenticated as the selected authenticated boot block for booting the computing device, based on the specific versions of the firmware indicated by the count values of the remaining one or more boot blocks that have been successfully authenticated.

24. A computing system operable to:

locate two or more boot blocks in the non-volatile memory, each of the boot blocks storing a different version of firmware operable to at least partially boot-up the computing device;

determining authenticity of each of the two or more boot blocks prior to selection of any of the boot blocks as a selected block for booting the computing device;

disregarding any of the boot blocks that have not been successfully authenticated prior to selection of any of the boot blocks as a selected block for booting the computing device;

obtaining one or more count values for one or more remaining boot blocks that have been successfully authenticated, wherein each count value is indicative of a specific version of the firmware; and selecting one of the remaining boot blocks as the selected authenticated boot block for booting the computing device, based on the specific versions of the firmware indicated by the count values of the remaining one or more boot blocks that have been successfully authenticated.

25. The computing system of the claim 24, wherein the computing system is further operable to:

obtaining updated firmware data;

selecting a disabled version of firmware data from two or more disabled versions of firmware data stored within the non-volatile memory, by authenticating each of the two or more disabled versions of firmware data, and based on authentication information and a version indictor stored for each one of the disabled versions of firmware data, the non-volatile memory also storing at least one enabled version of the firmware data;

initiating writing the updated firmware data where at least a part of the selected disabled version of firmware data was previously stored in the non-volatile memory, thereby initiating overwriting of the at least one part of the selected disabled version of the firmware with the updated firmware data;

determining whether the writing of the updated firmware data has successfully completed;

writing authentication information and a new version indicator for the updated firmware data stored in the non-volatile memory only when the determining determines that the writing of the updated firmware data has successfully completed, wherein the authentication information allows verification of authenticity of the updated firmware, and wherein the new version indicator is indicative of an updated version of the firmware data, thereby allowing the updated firmware data stored in the non-volatile memory to be identified as an updated version of the enabled version of firmware data.

26. A method for upgrading firmware in a computing device that includes a plurality of memory blocks of a non-volatile memory, the method comprising:

receiving updated firmware data;

identifying a disabled version of firmware data stored in more than one of the plurality of memory blocks of the non-volatile memory;

at a first one of the plurality of memory blocks:
(a) writing of a first portion of the updated firmware data to the first one of the plurality of memory blocks of the non-volatile memory;
(b) determining whether the writing of the updated firmware data at the first one of the plurality of memory blocks has successfully completed;
(c) writing authentication information for the first portion of the updated firmware data stored in the first one of the plurality of memory blocks of the non-volatile memory when the determining determines that the writing of the first portion of the updated firmware data has successfully completed, wherein the authentication information allows verification of authenticity of the updated first portion of the firmware in the memory block; and
(d) writing a remaining portion of the updated firmware to another one of the plurality of memory blocks that is different than the first memory block.

27. The method of claim 26, wherein the plurality of memory blocks are non-continuous memory blocks.

28. The method of claim 26, wherein the method further comprises:

erasing the identified disabled version of firmware data from the non-volatile memory.

29. The method of claim 26, wherein the method further comprises: writing authentication information for the remaining portion of the updated firmware data stored in the other one of the plurality of memory blocks of the non-volatile memory, wherein the authentication information allows verification of authenticity of the updated remaining portion of the firmware in the memory block.

* * * * *

UNITED STATES PATENT AND TRADEMARK OFFICE
CERTIFICATE OF CORRECTION

PATENT NO.         : 7,730,326 B2                                        Page 1 of 1
APPLICATION NO.    : 10/988054
DATED              : June 1, 2010
INVENTOR(S)        : Muthya Girish et al.

It is certified that error appears in the above-identified patent and that said Letters Patent is hereby corrected as shown below:

On the Title page, in field (56), under "Other Publications", in column 2, line 2, delete "dlsyr03" and insert -- dlsvr03 --, therefor.

In column 10, lines 10-11, in Claim 1, delete "indictor" and insert -- indicator --, therefor.

In column 11, line 52, in Claim 16, delete "rip or" and insert -- prior --, therefor.

In column 12, line 31, in Claim 22, delete "indictor" and insert -- indicator --, therefor.

In column 13, lines 50-51, in Claim 25, delete "indictor" and insert -- indicator --, therefor.

Signed and Sealed this
Eighth Day of November, 2011

David J. Kappos
*Director of the United States Patent and Trademark Office*